United States Patent [19]

Allen et al.

[11] Patent Number: 4,556,959
[45] Date of Patent: Dec. 3, 1985

[54] PRINTER SELECTION OF OPTIONS

[75] Inventors: Wade H. Allen, Austin; Theodore M. Cory, Leander; Raymond A. Thornton, Austin, all of Tex.

[73] Assignee: International Business Machines Corp., Armonk, N.Y.

[21] Appl. No.: 480,009

[22] Filed: Mar. 29, 1983

[51] Int. Cl.[4] .................. G06F 3/12; G06F 3/14
[52] U.S. Cl. ...................... 364/900; 340/712; 400/70
[58] Field of Search ... 364/200 MS File, 900 MS File; 400/63, 70, 71; 340/712

[56] References Cited

U.S. PATENT DOCUMENTS

| | | | |
|---|---|---|---|
| 3,593,300 | 7/1971 | Driscoll | 364/200 |
| 4,150,429 | 4/1979 | Ying | 364/200 |
| 4,245,308 | 1/1981 | Hirschman et al. | 364/200 |
| 4,282,583 | 8/1981 | Khan et al. | 364/900 |
| 4,441,163 | 4/1984 | Leikam et al. | 364/900 |
| 4,454,576 | 6/1984 | McInroy et al. | 364/200 |

FOREIGN PATENT DOCUMENTS

0042988A3 6/1981 European Pat. Off.

OTHER PUBLICATIONS

"Distributed Scheduling of Resources on Interconnection Networks", by Wah et al; AFIPS Conference Proceedings 1982 National Computer Conference, Houston, Jun. 7th-10th, 1982, pp. 697-709.
"The Distributed Computing System", by Farber et al; Institute of Electrical and Electronics Engineers, Computer Society International Conference, Feb. 1973, pp. 31-34.
"Print Authorization Matrix", by DeBry et al; IBM Technical Disclosure Bulletin, vol. 20, No. 6, Nov. 1977, pp. 2275-2277.
"Optional Default Response in Data Processor-Controlled Printers", by Czyszczewski et al; IBM Tech. Discl. Bull., vol. 25, No. 4, Sep. 1982, p. 2169.

Primary Examiner—James D. Thomas
Assistant Examiner—Thomas Lee
Attorney, Agent, or Firm—C. Lamont Whitham; James H. Barksdale; John L. Jackson

[57] ABSTRACT

An electronic office equipment network has a plurality of work stations (11) and a plurality of printers (—, 14, 15, 16) connected to a network bus (12). The printers have various options installed as for example hardware attachments for feed paper (22). The network also has a printer resource manager (17) for receiving requests for a printer from the work stations and notifying a work station when a printer can be claimed by the work station. The process of claiming a printer includes the step of specifying those printer options which are required by the work station in order to properly format the printer data stream and control the printer. One such option is the paper feed technique to be used by the printer. The user is given the option of choosing the currently installed printer options thereby allowing the printer to specify the options to the work station.

3 Claims, 5 Drawing Figures

PAPER FEED
ATTACHMENT
CONNECTION, 23

```
Set Printer :

Printer Model           5218 / 5228
   Pitch                   10
   Line Length             85
   Paper Handling          Continuous Paper
   Horizontal Tabs         10 20 30 40 50 60 70 80 90 100 110 120
   Vertical Tabs           10 20 30 40 50 60 70 80
   Page Length             66
   Lines / in              6
   Printing Paper Source   Top Choices :   a) Continuous Paper
            b) Cut Paper, Manual Feed
            c) Cut Paper, Automatic Feed
            d) Current Hardware Setup Enter  a, b, c, or d : _
```

PRINTER SELECTION OF OPTIONS

TECHNICAL FIELD

This invention relates to electronic office equipment networks and is particularly directed to a printer option that allows a printer claimed by a work station in the network to select a printer option according to the hardware attached to the printer.

BACKGROUND OF THE INVENTION

Electronic office equipment networks are a complex interconnection of processing terminals or work stations of varying capabilities performing an assortment of data processing and text processing operations and printers of various types including letter quality, dot matrix and the like and equipped with differing options such as paper feeding hardware. Such networks typically include a Printer Resource Manager (PRM) which receives requests from the work stations in the network for either a particular type of printer or for any available printer. When the requested printer becomes available, the PRM will notify the requesting work station which then claims the printer. The work station then needs to determine the hardware options that are attached to the printer in order to set up appropriate indicators. The work station can then output the correct data stream through the network to the claimed printer, i.e. ASCII data to an ASCII type printer and EBCDIC data to an EBCDIC type printer.

A printer will have various options which must be identified in order for the work station to output the proper data stream. For example, a printer may have hardware attachments that permit the feeding of continuous fan-fold paper or the feeding of cut paper, and if equipped to feed cut paper, the feed may be either manual or automatic. The user at the work station is given three choices: (a) Continuous Paper; (b) Cut Paper, Manual Feed; or (c) Cut Paper, Automatic Feed. If the selected option calls for a hardware attachment which is not present when printing is attempted, a Hardware Mismatch is flagged to the user. There are many times when the user merely wants a hard copy of the data stream and does not care either what type of printer or which options may be attached to produce the hard copy. In this case, it would be desirable to provide the user at the work station with what amounts to a "don't care" choice in specifying printer options.

SUMMARY OF THE INVENTION

It is therefore an object of the present invention to simplify the user's requirement to specify the printer options in an electronic office equipment network.

It is a more specific object of the invention to provide the user of a work station in an electronic office equipment network a "don't care" choice when specifying printer options.

It is yet another object of the invention in a specific application thereof to provide the user of a work station with a more flexible choice of printer paper handling techniques.

The invention accomplishes the foregoing objects in the specific example of paper handling techniques by providing the user with a fourth choice or option. This option is Current Hardware Setup. Selection of this option lets the printer select the paper handling technique according to the hardware actually attached to the printer. Thus, if an automatic sheet feed device is attached to the printer, the printer uses option (c). If a tractor feed device is attached, the printer uses option (a). Otherwise, the printer uses option (b). The selection of paper handling technique is but one concrete example of the application of the invention. Those skilled in the art will readily recognize that the broader teachings of the invention may be applied to any options, whether hardware or software, that may be attached to the printer which must be specified by the user at the work station and which the printer is capable of communicating to the work station.

BRIEF DESCRIPTION OF THE DRAWINGS

The foregoing and other objects, advantages and aspects of the invention will be better understood from the following detailed description of the invention with reference to the accompanying drawings, in which.

BEST MODE FOR CARRYING OUT THE INVENTION

Figure 1:
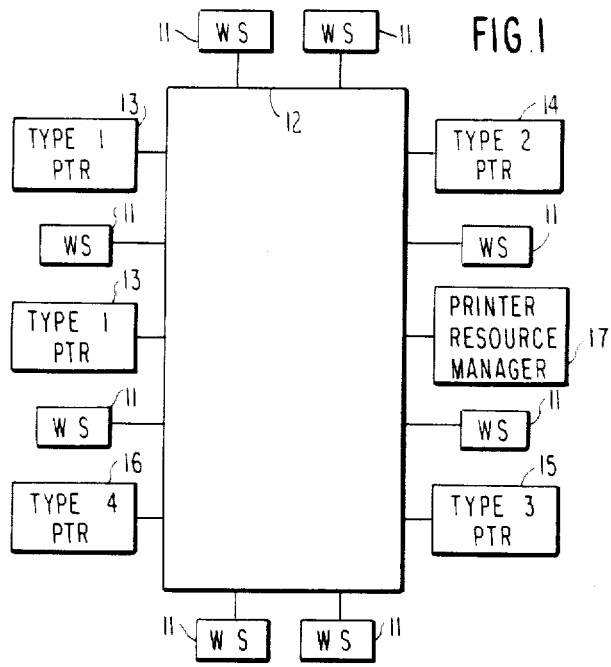
FIG. 1 is a block diagram of a typical office equipment network.

Referring now to the drawings, and more particularly to FIG. 1, a typical electronic office equipment network might take the form of a simple loop as shown or could be a more complex multiple loop or star network. In any case, the principles of the invention are the same, and so the simple loop configuration shown in FIG. 1 may be taken as exemplary. As shown in the figure, a plurality of work stations 11 are connected to a common network bus 12. Also connected to the network bus are a plurality of printers, and in many cases these printers may be of different types. Thus, there is shown in FIG. 1 two printers 13 identified as a "Type 1" printer and printers 14, 15 and 16 identified as "Type 2", "Type 3" and "Type 4" printers, respectively. The assignment of a printer to a particular work station is controlled by the Printer Resource Manager (PRM) 17 which is also connected to the network bus 12.

Figure 2:
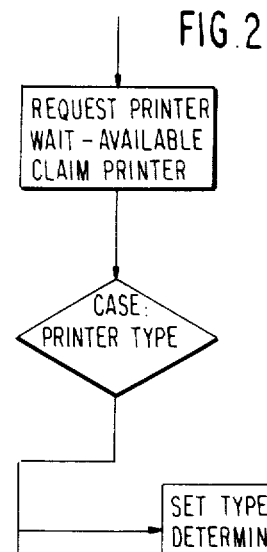
FIG. 2 is a flow diagram showing the operations involved in requesting and claiming a printer for a work station.

The PRM 17 receives requests from the work stations 11 for either a particular printer or for any available printer. When the requested printer becomes available, the PRM 17 will notify the requesting work station which then claims the printer. The procedure is shown in the flow diagram of FIG. 2 and summarized as follows:

Check which printer type to request. The user will be given a choice of the several types of printers available in the network including "don't care" choice. The user will be provided with the following prompt:

| PRINTER TYPES: | TYPE = 1 |
| --- | --- |
| | TYPE = 2 |

```
            TYPE = N
            TYPE = *(ANY PRINTER
                     AVAILABLE)
```

Request printer from network. By making a choice of printer, the user requests a printer from the network. This request is noted by the PRM 17, and then the user must wait until the requested printer is available. If the user is not particular about the form of the printed copy, TYPE=* may be selected in which case the waiting can be minimized.

Claim the printer. When the requested printer becomes available, the requesting work station claims the printer. In those cases where a specific type of printer has been requested and claimed, it is then necessary to set the printer profile to the printer type and to set indicators for printer options which in the example given, is the paper feed technique. This is done with the screen display shown in FIG. 4.

Check which printer options are installed. The printer can be interrogated to determine which printer options, such as paper feed attachments, are installed. If this is done, the user waits until the printer provides the attachment information and then sets indicators for the attachment or changes the attachment.

Figures 3, 4:
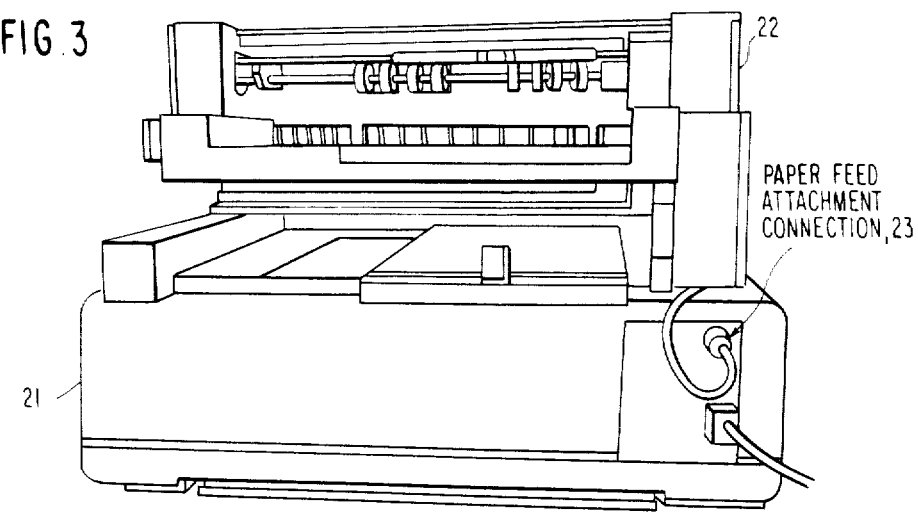
FIG. 3 is a pictorial view of an intelligent printer with an automatic sheet feed attachment.
FIG. 4 illustrates the screen display according to a specific example of the invention giving the user of the work station the choice of current hardware setup for the printer handling technique.

As will be appreciated, the printers used in this network are microprocessor based printers with limited intelligence which are capable of responding to interrogations and providing information on the kind of options which may be attached. Such intelligent printers often have the capability to "sense" what type of options are currently installed. This "sensing" is typically made possible by means of various types of sensors, switches and cable connections. Different intelligent printers use these or other methods of acquiring information to control the print function. As a specific example, FIG. 3 shows an IBM 5218 printer 21 with an automatic sheet feeder 22 attached. In this example, there is provided a cable 23 from the sheet feeder 22 which is plugged into the printer 21. The type of cable connection (or lack of it) allows the printer 22 to sense what paper attachment in present. Not only is the intelligent printer capable of sensing the type of options that may be installed, it is also capable of responding to a query from a work station in the network by identifying itself as to type and any options which may be installed.

According to the present invention as applied to the case of paper feeding technique, the user is given a fourth choice in specifying the paper feeding technique. This fourth choice, like the request for any available printer, is a "don't care" choice. In other words, the user will accept whatever paper feed technique is dictated by the hardware attached to the claimed printer. This is illustrated by the display screen shown in FIG. 4. In this figure, it will be noted that "Paper Handling" in the left column is underlined. The underlining indicates the current printer parameter which may be specified. The right hand column shows that "Continuous Paper" is currently specified. The choices that the user may specify are listed toward the bottom of the screen as (a) Continuous Paper; (b) Cut Paper, Manual Feed; (c) Cut Paper, Automatic Feed; and (d) Current Hardware Setup. The user then types in one of the letters a, b, c or d in order to change the paper handling technique. The first three choices have been provided in prior systems. In selecting one of the options a, b or c, if the selected option calls for a hardware attachment which is not present when printing is attempted, a Hardware Mismatch is flagged.

The fourth choice, d, selects the current hardware setup. This option lets the printer select the paper handling technique according to the attached hardware. If the sheet feed device is attached as shown in FIG. 3, Cut Paper, Automatic Feed is used. If the tractor feed device is attached, Continuous Paper is used. Otherwise, Cut Paper, Manual Feed is used. When the user selects this fourth option, the printer is interrogated by the work station for the paper feed technique. The information supplied in response to this interrogation then automatically sets the indicators for the paper feed technique so that the proper control functions will be transmitted by the work station to the printer.

Figure 5:
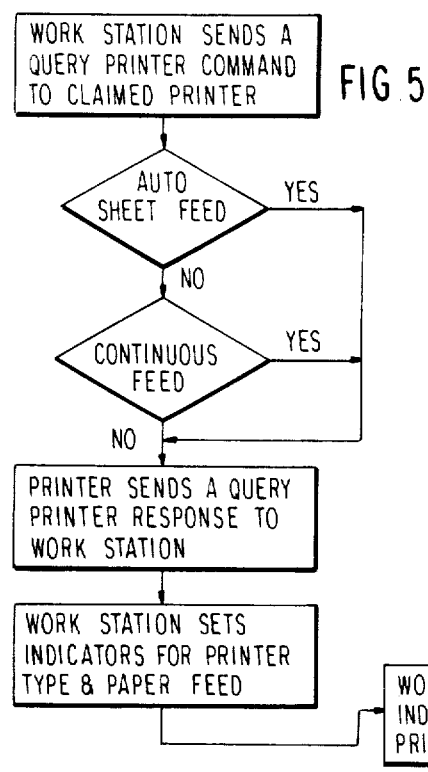
FIG. 5 is a flow diagram showing the operations involved when the current hardware option illustrated in FIG. 4 is selected by the user of the work station.

The process by which this interrogation and response are accomplished is illustrated in the flow diagram of FIG. 5. In response to the user selection of the option of Current Hardware Setup, the work station sends a Query Printer command to the printer that has been claimed by that work station. In response to the Query Printer command, the printer senses or examines what paper feed attachment is presently installed. In the case of the IBM 5218 printer shown in FIG. 3, this is accomplished by means of the cable connection. Then the printer sends a Query Printer response to the requesting work station. This response includes both the printer type and the paper feed technique. Upon receiving the Query Printer response, the work station sets its indicators (software) as to the printer type and the paper feed technique. The work station uses the indicators to format the data stream and control the printer according tho their settings.

The invention has been described in terms of one specific example, the automatic setting of indicators for a paper feed hardware attachment. The principles of the invention may be applied to other printer options which may the installed and for which indicators must be set in order for the work station to properly format the data stream in order to control the printer. Thus, any option, whether hardware or software, which the intelligent printer is capable of sensing or recognizing and can be identified by the printer in response to a Query Printer command could be the subject for automatic setting of indicators as taught by this invention. One such hardware option in a letter quality printer is the choice of print wheels. Other options will readily suggest themselves to those of ordinary skill in the art.

We claim:

1. In an electronic office equipment network having a plurality of work stations and a plurality of printers connected to a network bus, said printers having various printer options installed which must be specified in order for a work station to properly format the printer data stream and control a printer, said network further comprising a printer resource manager means for receiving requests for a printer from the work stations and notifying a work station when a printer becomes available so that the printer can be claimed by the work station, said printers including means for sensing the printer options installed and transmitting over said network bus to a requesting work station information identifying the printer options installed, wherein the process of specifying printer options thereby claiming a printer by a requesting work station for properly formatting the printer data stream and control of the printer comprises the steps of:
- displaying a plurality of choices of said printer options including the choice of current options installed;
- manually selecting one of the plurality of choices of said printer options thereby claiming a printer; and
- specifying by the printer to the requesting work station the printer options which are installed on the printer when the choice of current options installed is chosen for enabling the requesting work station to properly format the printer data stream and control the printer.

2. In an electronic office equipment network having a plurality of work stations and a plurality of printers connected to a network bus, said printers having various printer options installed which must be specified in order for a work station to properly format the printer data stream and control a printer, said network further comprising a printer resource manager means for receiving requests for a printer from the work stations and notifying a work station when a printer becomes available so that the printer can be claimed by the work station, said printers including means for sensing the printer options installed and transmitting over said network bus to a requesting work station information identifying the printer options installed, wherein the process of specifying printer options thereby claiming a printer by a requesting work station for properly formatting the printer data stream and control of the printer comprises the steps of:
- displaying a plurality of choices of said printer options including the choice of current options installed;
- manually selecting one of the plurality of choices of said printer options thereby claiming a printer;
- interrogating the printer by the work station to determine what printer options are installed when the choice of current options installed is chosen;
- sensing by the printer the options installed and responding to the interrogation by the work station by transmitting over said network information identifying the installed options; and
- selecting by the work station indicators according to the installed printer options as identified by the printer so that the work station can properly format the printer data stream and control the printer during a print operation.

3. In an electronic office equipment network having a plurality of work stations and a plurality of printers connected to a network bus, said printers having various paper feeding options installed which must be specified in order for a work station to properly format the printer data steam and control a printer, said network further comprising a printer resource means for receiving requests for a printer from the work stations and notifying a work station when a printer becomes available so that the printer can be claimed by the work station, said printers including means for sensing the paper feeding options installed and transmitting over said network bus to a requesting work station information identifying the paper feeding option installed, wherein the process of specifying printer paper feeding option thereby claiming a printer by a work station for properly formatting the printer data stream and control the printer comprises the steps of:
- displaying a plurality of choices of said paper feeding options including the choice of current paper feeding option installed;
- manually selecting one of the plurality of choices of said paper feeding options thereby claiming a printer;
- interrogating the printer by the work station when the choice of the current paper feeding option installed is chosen to determine what paper feeding option is installed on the printer;
- sensing by the printer the paper feeding option which is installed on the printer and responding to said interrogation by the work station by transmitting over said network bus information identifying the paper feeding option that is installed; and
- selecting by the work station indicators according to the paper feeding option identified by the printer so that the work station can properly format the printer data stream and control the printer during a print operation.

* * * * *